United States Patent [19]

Yamamura

[11] Patent Number: 5,092,740
[45] Date of Patent: Mar. 3, 1992

[54] COMPOSITE VACUUM PUMP

[75] Inventor: Akira Yamamura, Tokyo, Japan

[73] Assignee: Nippon Ferrofluidics Corporation, Tokyo, Japan

[21] Appl. No.: 344,652

[22] Filed: Apr. 27, 1989

[30] Foreign Application Priority Data

Apr. 30, 1988 [JP] Japan ................. 63-108117

[51] Int. Cl.⁵ ............................................. F04B 37/14
[52] U.S. Cl. .................................. 417/201; 417/423.4
[58] Field of Search ................. 417/201, 203, 423.4; 415/40

[56] References Cited

U.S. PATENT DOCUMENTS 3,104,802  9/1963  Eckberg ............................. 417/201 X
3,554,263  1/1971  Bachman ............................ 417/201 X
4,797,068  1/1989  Hayakawa et al. .................. 417/201

Primary Examiner—John C. Fox
Attorney, Agent, or Firm—David S. Woronoff

[57] ABSTRACT

A composite vacuum pump system having first and second vacuum pumps each having its own rotor and drive motor in which the exhaust of the first vacuum pump is removably coupled to the inlet of the second vacuum pump and the first vacuum pump rotor is driven at a constant torque and in which the second vacuum pump has an inlet for permitting the introduction into the pump of a heavy gas for increasing the efficiency of the pumping system.

4 Claims, 3 Drawing Sheets

COMPOSITE VACUUM PUMP

FIELD OF THE INVENTION

The present invention relates to a composite vacuum pump formed from the disconnectable union of a screw-type or threaded vacuum pump and a turbo-molecular vacuum pump.

In particular the present invention relates to a composite pump of the type described in which each pump has its own motor and drive system.

SUMMARY OF THE INVENTION

The present invention teaches a composite vacuum pump system having first and second vacuum pumps each having its own rotor and drive motor in which the exhaust of the first vacuum pump is removably coupled to the inlet of the second vacuum pump and the first vacuum pump rotor is driven at a constant torque. The second vacuum pump has an inlet for permitting the introduction into the pump of a heavy gas for increasing the efficiency of the pumping system.

The known design for composite pumps of the type disclosed employs a single drive system for powering both pumps. While such systems are workable, they place an unusually heavy power demand on the single drive system.

The conventional thinking in using two separate drive systems for the screw-type pump and the turbo-molecular pump seems to require a relatively complicated control system.

DESCRIPTION

Figure 1:
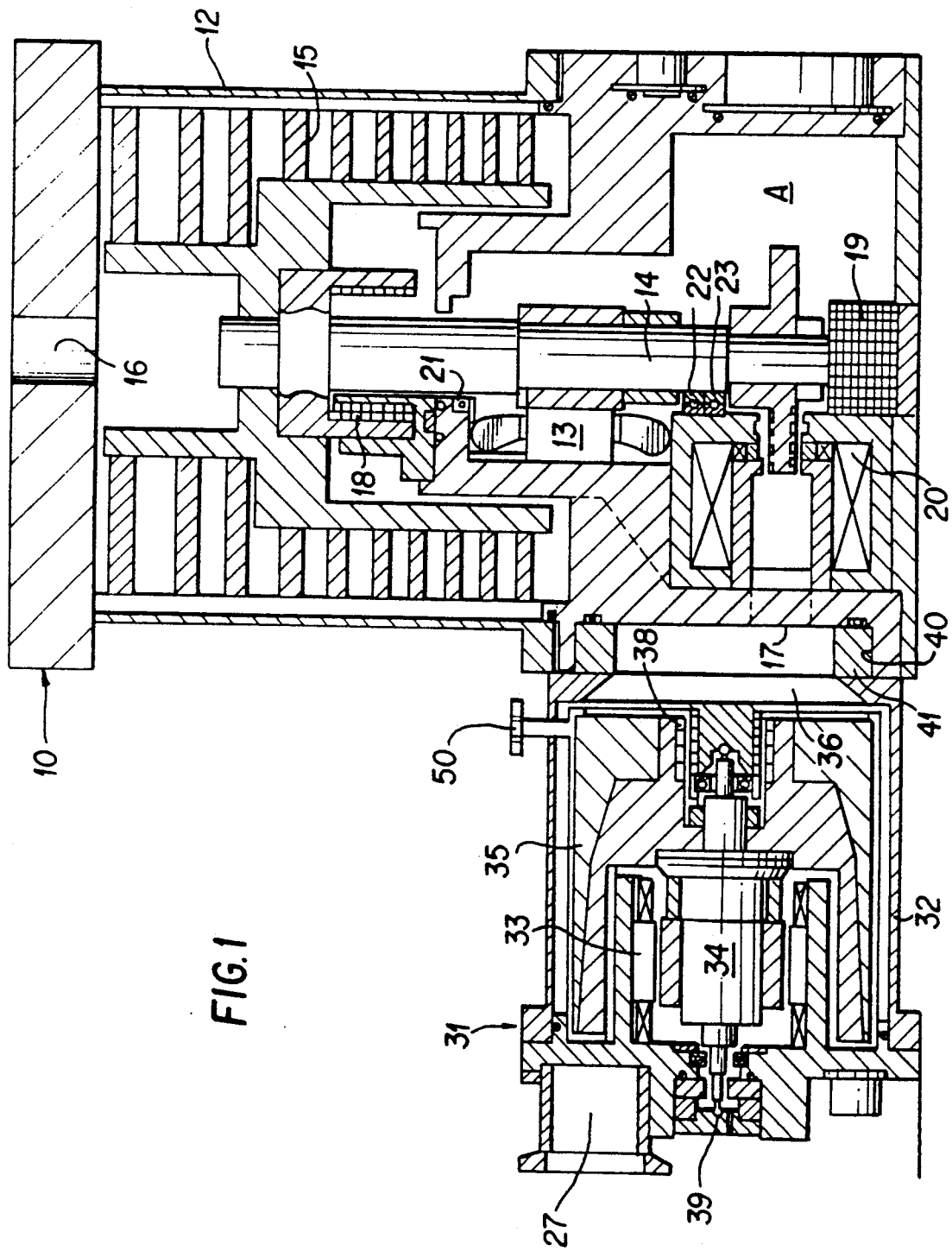
FIG. 1 shows a sectional view taken along the vertical axis of one embodiment of the present invention.

In FIG. 1, the number 10 indicates the turbo-molecular pump portion and numeral 31 indicates generally the screw-type pump portion of one embodiment of the present invention.

The turbo-molecular pump 10 has a rotor shaft 14 driven by a motor 314 disposed within a main body housing 12. The rotor shaft 14 rotates the turbofan 15 which draws gas from the inlet 16 to be discharged at the outlet 17. Magnetic bearings 18 and 19 and 20 support the rotor shaft 14. Bearings 18 and 19 give radial support while bearing 20 gives axial support. Safety, back-up, ball or roller bearings 21, 22 and 23, are present to prevent a destructive crash of the rotor if the magnetic bearings failed for any reason.

The screw-type (threaded) vacuum pump has a rotor shaft 34 to be powered by a motor 33 disposed within the housing 32. The rotor 35 is rotated by the shaft 34 which is supported at one by radial magnetic bearing 38 and at the other end by radial and axial magnetic bearing 39. The magnetic bearing 39 uses a magnetic fluid (ferrofluid). A fail safe ball and roller bearing 40 protects rotor 35 in the unlikely event the magnetic bearings fail.

First and second mounting members are shown as a projection 41 and mating aperture 40 which are located near the exhaust 17 of the housing 12 for the turbo-molecular pump 10 and near the inlet 36 of the screw-type pump housing 32 respectively. When the pumps are connected by the projection 41 and mating aperture 40, the exhaust outlet 17 of the turbo pump communicates with the inlet 36 of the screw-type pump 31.

Figure 2:
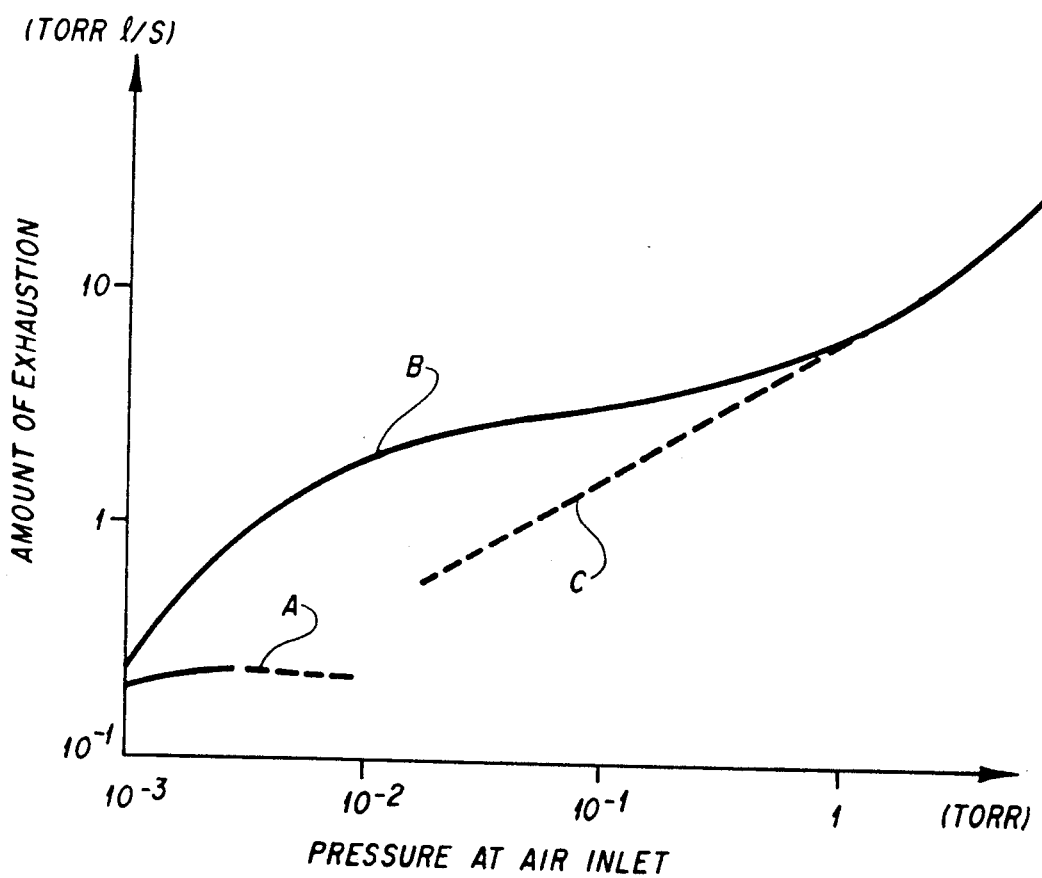
FIG. 2 shows a plot of the interrelationship between air inlet pressure and the air flow rate in the solid line. The dotted lines on the graph show the rate of gas removed as a function of air-inlet pressure.

In operation, when the pumps are connected and the motor 13 of the turbo pump is driven at constant torque as evacuation starts, if pressure in chamber "A" is high, turbofan 15 will be unable to overcome the high viscosity present. In that situation, evacuation will be begun by the screw-type pump. As the pressure in chamber "A" decreases, the turbofan 15 will begin to rotate and more gas will be expelled from chamber "A". This is shown in FIG. 2 as the zone below 1 Torr.

When the pressure in chamber "A" decreases further lowering the back pressure on the turbo-molecular pump 10 or the pressure at the air inlet 36 of the screw-type pump 31 drops below 0.001 Torr (shown in FIG. 2), the turbo-molecular pump 10 will operate as a predetermined compression ratio and will go into steady operation in which the pressure in chamber "A" is kept at a fixed predetermined level.

In the steady state operational mode, there are two control alternatives forming a part of the present invention. The first alternative is to drive the screw-type pump 21 at any particular capacity, such as maximum capacity. The pressure in chamber "A" and the exhaust flow rate are determined by detecting the load on the turbo pump 10 by reading any of the following: torque, drive current, slip frequency, or rotational speed. If these measurements are taken a vacuum gauge or flow meter will not be necessary. In the second alternative, rotational speed and torque output of the turbo-molecular pump 10 are controlled by an external signal to control the exhaust flow rate. Such a control can eliminate the need for a variable conductance valve for flow rate control in a semiconductor production line.

Figure 3:
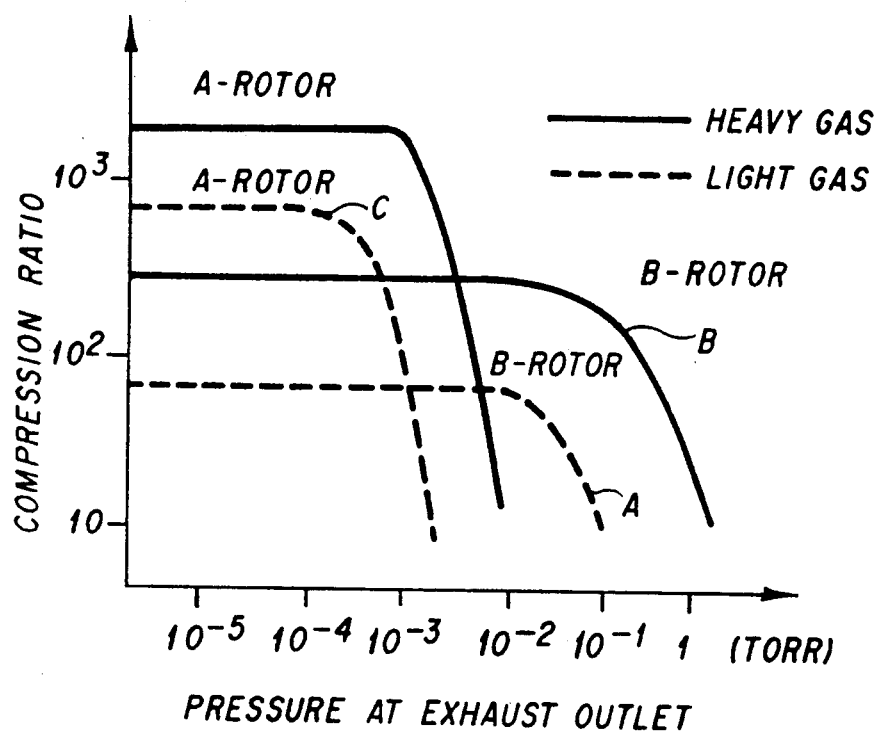
FIG. 3 shows the relationship between pressure at the exhaust end of the present invention and the air compression ratio.

FIG. 1 shows an inlet channel 50 formed in the housing of pump 31 for admitting a heavy gas to increase the compression ratio of the pump 31. If a light gas, such a hydrogen or helium are being removed, pumps 10 and 31 may be somewhat ineffective since a sufficient compression ratio may not be obtained as shown by the broken line A in FIG. 2. The introduction of a small amount of a heavy gas solves this problem. See broken line C in FIG. 3.

The invention described above achieves the following advantages: The pumps 10 and 31 can be used either together or apart. When the pumps are used together, a high compression ratio can be obtained from a physically small structure. If one pump fails, the other pump's operation may be sufficient to keep chamber "A" at a sufficiently low pressure to eliminate the need for a gate valve.

With separate power sources, the turbo-pump is not being driven against high viscosity thus wasting power. Instead the turbo-molecular pump does not start operation until the screw-type type pump has sufficiently evacuated the chamber to make the use of the turbo-molecular pump practically useful. This arrangement permits both drives, 13 and 23, to be of low power and to require only low power. If the turbo pump is driven by motor 13 at constant torque, the pump 10 automatically starts operating when the pressure at the air inlet 16 drops to or below a predetermined level, i.e. when the viscosity resistance of the gas to be evacuated drops just below the level of the drive torque. This result eliminates the need for a special control.

Figure 4:
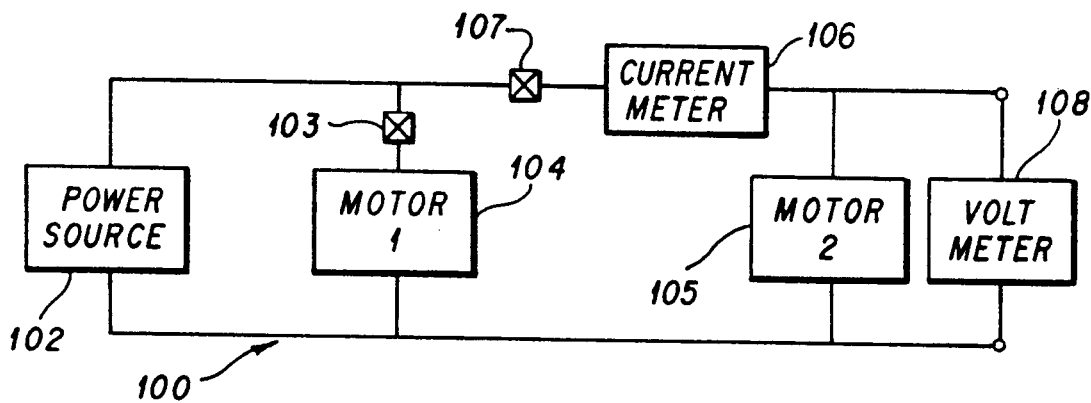
FIG. 4 shows a circuit diagram forming a part of one embodiment of the present invention.

FIG. 4 shows one circuit for performing this inventive combination. A power source 102 is shown supplying motor 1, 104, representing the motor of the screw-type pump and also supplying power to motor 2, 105, the turbo-pump motor. The motors are shown in parallel with the power source. Obviously two separate power sources could be used. Switches 103 and 107 are electrically in series with motors 104 and 105 respectively. A current meter 106 is shown in series with the turbo-pump motor to measure the current through it. The meter can be calibrated to read directly in torque. To the same general effect, a volt meter 108 is shown in parallel with the turbo-pump motor to read the voltage across the motor. Power output or speed can be measured by reading the motor voltage.

Although the present invention has been described in connection with a screw-type pump, a short-fan type vacuum pump could also be used.

The present invention has been described in connection with specific structures but it is not to be deemed limited thereto. The present invention should be construed in the light of the following claims.

What is claimed:
1. A composite vacuum pump comprising:
a first vacuum pump having a first drive means and a first rotor means driven by said first drive contained within a housing means;
said housing means having gas inlet and gas outlet means;
a second vacuum pump having a second drive means and a second rotor means driven by said second drive means contained within a housing means;
said housing means having gas inlet and gas outlet means;
said first pump outlet means connected to the inlet means of said second pump;
said first drive means being driven at constant torque.
2. The device claimed in claim 1 wherein said first pump outlet means is disconnectable from said second pump inlet means.
3. The device claimed in claim 1 including further means for detecting the torque load on said first pump drive means when said second pump drive means is driven at a predetermined speed.
4. The device claimed in claim 1 including further second gas inlet means formed in said second pump housing means in which said second inlet means communicates with the inlet means of said second pump.

* * * * *